United States Patent [19]

Toropov et al.

[11] Patent Number: 4,491,002
[45] Date of Patent: Jan. 1, 1985

[54] METHOD FOR FORMING ON WORKPIECE RESILIENT THREAD HAVING CLOSED HELICAL CAVITY INSIDE THE THREAD

[76] Inventors: Gennady A. Toropov, ulitsa Mironova 17, kv. 45; Stepan P. Shamenko, prospekt Geroev, 33, korpus 1, kv. 45; Rostislav P. Didyk, prospekt Karla Marxa, 20, kv. 76; Anatoly A. Toropov, ulitsa Komsomolskaya 27, kv. 6, all of Dnepropetrovsk, U.S.S.R.

[21] Appl. No.: 355,594
[22] PCT Filed: Jun. 26, 1980
[86] PCT No.: PCT/SU80/00113
    § 371 Date: Feb. 18, 1982
    § 102(e) Date: Feb. 18, 1982
[87] PCT Pub. No.: WO82/00014
    PCT Pub. Date: Jan. 7, 1982

[30] Foreign Application Priority Data

Jun. 26, 1980 [SU] U.S.S.R. ............... 8000113

[51] Int. Cl.³ .................................. B21H 3/08
[52] U.S. Cl. ........................... 72/118; 72/98; 72/103; 10/152 T
[58] Field of Search ............ 72/88, 98, 118, 119, 72/123, 71, 103; 10/152 R, 152 T, 141 R, 10 R; 29/156.8 H, 157 AH

[56] References Cited

U.S. PATENT DOCUMENTS

| | | |
|---|---|---|
| 2,349,863 | 5/1941 | Hallberg . |
| 2,645,954 | 7/1953 | Pfingston ............... 72/118 |
| 3,258,797 | 7/1966 | Budd ................. 10/152 T |
| 3,782,700 | 3/1975 | Matej . |
| 3,813,718 | 6/1974 | Kamiya ................. 72/88 |
| 3,890,685 | 6/1975 | Rünte ................. 10/10 R |
| 4,168,618 | 9/1979 | Saier et al. ............ 72/98 |
| 4,226,870 | 1/1984 | Toropov et al. ....... 72/118 |
| 4,353,234 | 10/1982 | Brothers et al. ......... 72/98 |

FOREIGN PATENT DOCUMENTS

| | | |
|---|---|---|
| 1086661 | 8/1960 | Fed. Rep. of Germany . |
| 66870 | 5/1969 | German Democratic Rep. . |
| 48-20977 | 6/1973 | Japan . |
| 473554 | 2/1976 | U.S.S.R. . |
| 625824 | 9/1978 | U.S.S.R. . |

Primary Examiner—Francis S. Husar
Attorney, Agent, or Firm—Lilling & Greenspan

[57] ABSTRACT

A method of forming on a workpiece a resilient thread, having a closed helical cavity inside the thread, includes plastic deformation of the walls of a preformed helical groove whose depth exceeds the depth of the roots of the thread to be obtained. The volume of the workpiece material, expelled in forming the helical groove, corresponds to the volume of the closed helical cavity inside the thread being obtained.

A thread-forming tool for carrying out the method comprises a shank and an operating piece which consists of a groove-forming portion and a thread-forming portion arranged in series along one axis and having the same pitch of projections of their thread. The groove-forming portion and the thread-forming portion are displaced relative to each other in the axial direction at least by half the pitch, the major diameter of the groove-forming portion exceeding the major diameter of the thread-forming portion.

1 Claim, 5 Drawing Figures

METHOD FOR FORMING ON WORKPIECE RESILIENT THREAD HAVING CLOSED HELICAL CAVITY INSIDE THE THREAD

FIELD OF THE INVENTION

The invention relates to the art of metal working by pressure, and more particularly it concerns methods and tools for forming on a workpiece resilient threads having a closed helical cavity inside the thread by plastic deformation of the metal in a cold state.

DESCRIPTION OF THE PRIOR ART

Methods of forming threads by plastic deformation of the metal of a workpiece, by rolling in particular, which have wide application in modern practice (see, for example, Pisarevsky M. I., Nakativanie tochnikh rezb i shlitsev, Moscow-Leningrad, Mashgiz, 1968), together with such obvious advantages as high productive capacity, metal saving and high precision of resulting threads, are characterized by substantial disadvantages. Among these are, first of all, a strict tolerance for the size of a workpiece to prevent jamming of the tool when forming a thread in bores, and considerable thread-forming forces acting on the tool, which is particularly unwanted when forming a thread in bores of small diameter (less than 8 mm).

Known in the art is a method of forming a resilient thread having a closed helical cavity inside the thread disclosed in Japan Pat. No. 48-20,977 published June 25, 1973.

The above method comprises performing a helical groove in a workpiece and subsequent plastic deformation of its walls by means of a thread-forming tool. As noted in the patent specification, the helical groove is formed so as to have a depth in the range of ½ of the depth of thread to the complete depth of thread, but not in excess.

To form a thread, the thread-forming tool is deepened in the tops of the helical groove deforming its walls, which results in obtaining a thread having a closed helical cavity inside the thread.

The thread thus obtained, by virtue of the closed helical cavity inside the thread, allows widening of the tolerance for the size of a workpiece, reduction of the thread-forming forces acting on the tool and elimination of jamming of the tool in the operation of rolling a female thread.

However, when deforming a helical groove having a depth in the range of half the depth of the thread being obtained to its complete depth but not in excess, the future cavity is positioned at the tops of the thread and is limited by the size of its projections. Moreover, the most intensive deformation of the workpiece material under the action of the thread-forming portion of the tool takes place at the tops of the thread, and the cavity turns out to be narrow. It prevents the substantial increase of the thread resilience, widening of the range of tolerance for workpiece size, and reduction of the torque in the rotation of the thread-forming tool in the operation of forming a thread.

Known in the art is a threading tool-screw tap for rolling in bores resilient thread having a closed helical cavity inside the thread as in USSR Inventor's Certificate No. 625,824 published Sept. 30, 1978.

This screw tap comprises a groove-forming portion and a thread-forming portion arranged in series and rigidly connected with each other. Projections of the thread of both portions have the same pitch and are displaced along the axis of the screw tap at least by half the pitch relative to each other, the major diameter of the projections of the groove-forming portion not exceeding the major diameter of the thread-forming portion.

To obtain a resilient thread having a closed helical cavity inside the thread, the screw tap is screwed in a bore. In doing so, the first (groove-forming) portion forms a groove having a depth within the range of half the depth of the thread being obtained to its complete depth. In subsequent motion of the screw tap, the thread-forming portion following the groove-forming portion deepens in the tops of the helical groove and deforms its walls, which results in forming a thread having a closed helical cavity inside the thread.

As in the above-described method, the volume of the cavity in the thread obtained by this screw tap is limited by the size of the projections of its thread because the helical groove formed by the groove-forming portion has a depth not exceeding the complete depth of the thread being obtained, the cavity being positioned in the place of the most intensive metal deformation caused by the action of the thread-forming portion and therefore having a configuration stretched along the axis of the thread. All this, as noted above, prevents the substantial increase of the thread resilience, widening of the range of tolerance of workpiece size, and reduction of the torque in the rotation of the screw tap.

SUMMARY OF THE INVENTION

The invention is a method of forming a resilient thread having a closed helical cavity inside the thread and a thread-forming tool which, by means of displacing the cavity deeper in the thread profile of the thread being obtained, allows increasing the resilience of this thread, widening of the range of tolerance for the size of a workpiece and also reduces the torque in rotation of the tool in the process of forming a thread.

The problem is solved by a method of forming on a workpiece a resilient thread having a closed helical cavity in the thread by plastic deformation of the walls of a preformed helical groove. According to the invention, the helical groove is formed having a depth exceeding by value the depth of the root of the thread being obtained, and the volume of the workpiece material expelled in forming the helical groove corresponds to the volume of the closed helical cavity inside the thread being obtained.

With this method of forming a thread, the roots of the preformed helical groove will be deeper than the roots of the future thread, and the cavity being obtained in the operation of plastic deformation of walls of the helical groove will be displaced deeper in the thread profile of the thread being obtained. Furthermore, the cavity is remote from the place of the most intensive deformation of the workpiece material taking place under the action of the thread-forming tool, and therefore its shape and volume make it possible to considerably increase the elasticity of the thread, to widen the range of tolerance (a possibility appears to obtain a thread on workpieces whose size is not adequate to form a thread by known in the art methods) and to reduce the torque in rotation of the tool in the process of forming a thread.

The problem is also solved by a thread-forming tool for carrying out the method, comprising a shank and a threading head consisting of a groove-forming portion and a thread-forming portion arranged in series and having equal pitches of the projections of their thread, which are displaced along the axis of the tool relative to each other at least by half the pitch. According to the invention, the major diameter of the groove-forming portion exceeds the major diameter of the thread-forming portion.

The groove-forming portion is preferably positioned in advance of the thread-forming portion at the side of the shank, the thread-forming portion having a taking section at the side of the groove-forming portion.

In a modification of the thread-forming tool, the groove-forming portion and the thread-forming portion are each made in the form of rollers uniformly positioned on the circumference of a body and having an annular thread equal to the pitch of the thread to be obtained.

BRIEF DESCRIPTION OF THE DRAWINGS

The present invention will now be explained with reference to certain embodiments thereof and the accompanying drawings, wherein.

DETAILED DESCRIPTION OF THE INVENTION

Forming a thread according to said method is carried out as follows.

On a workpiece 1 a helical groove 2 having a pitch equal to the pitch of the thread to be obtained and a depth exceeding the depth of the root of the thread profile of the thread to be obtained is preformed, and the volume of the workpiece material expelled in forming the helical groove 2 should correspond to the volume of the closed helical cavity 3 inside the profile of the thread to be obtained by subsequent deforming of the walls of this helical groove 2.

An additional volume of the material, expelled in the operation of forming a groove having a depth exceeding that of the root of a thread to be obtained, makes it possible to widen the range of tolerance for the size of a workpiece and to form a thread, for example, in bores whose diameter is in the range of the angle diameter to the major diameter of a thread to be obtained. Moreover, this method may be utilized for restoration of a stripped thread whose remained portion is 20 or less percent of the original one (80% wear).

It should be noted that the cavity being obtained in the thread profile of the thread being formed by this method has a larger volume than that in the known resilient threads, it is remote from the place of the most intensive deformation of the material caused by the action of the thread-forming portion of the tool and therefore imparts larger elasticity to the thread being obtained and reduces the torque in the process of forming a thread.

Figures 1, 2:
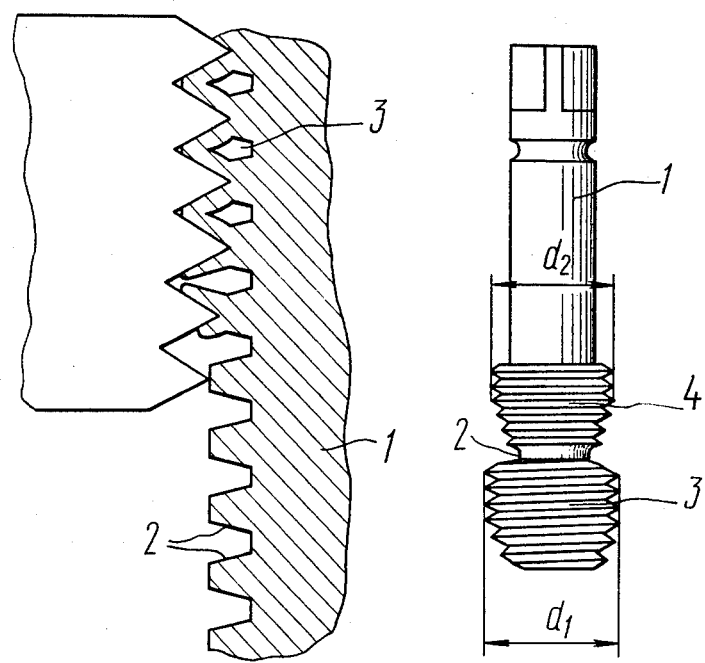
FIG. 1 diagrammatically illustrates the process of plastic deformation of the walls of the preformed helical groove, according to the invention.
FIG. 2 is an elevational view of the thread-forming tool (screw tap) according to the invention.

A thread-forming tool carrying out this method, for example a chipless tap, comprises a shank 1 (FIG. 2) and a threading head 2 consisting of a groove-forming portion 3 and a thread-forming portion 4 arranged in series and having equal pitches of the projections of their threads, which are displaced along the axis of the tool relative to each other at least by half the pitch, the major diameter $d_1$ of the groove-forming portion 3 exceeding the major diameter $d_2$ of the thread-forming portion 4. According to one embodiment, the groove-forming portion 3 is positioned in advance of the thread-forming portion 4 at the side of the shank 1 (FIG. 3), the thread-forming portion having a taking section 5 at the side of the groove-forming portion.

Figures 3, 4, 5:
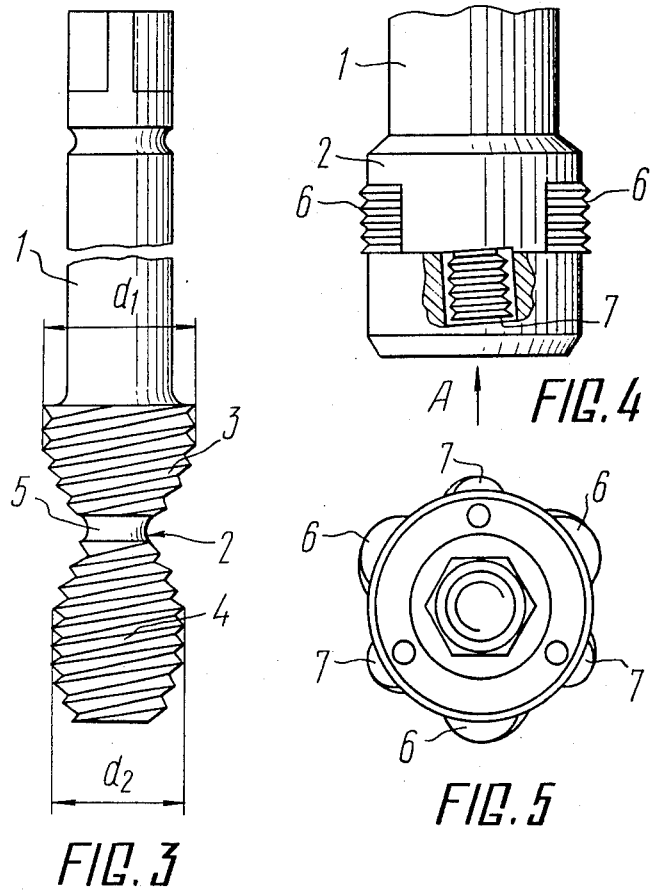
FIG. 3 diagrammatically illustrates a modification of the screw tap wherein the groove-forming portion is positioned in advance of the thread-forming portion at the side of the shank.
FIG. 4 diagrammatically illustrates a modification of the thread-forming tool with rollers, according to the invention.
FIG. 5 is an end view of the device shown in FIG. 4, viewed from the start portion of the tool.

As shown in FIG. 4 and 5, the groove-forming portion 3 and the thread-forming portion 4 in the thread-forming tool may be each made in the form of respective rollers 7 and 8 uniformly positioned on the circumference of a body 6 and having an annular thread equal to the pitch of the thread to be obtained.

A modification of the thread-forming tool is shown in FIGS. 4 and 5 where the groove-forming portion 3 with the rollers 6 is positioned in advance of the thread-forming portion 4 with the rollers 7 at the side of the shank 1. It is understood that a modification is possible, according to which the portions 3 and 4 with rollers 6 and 7 will be positioned in the back order, i.e. the portion 4 with the rollers 6 will be positioned in advance of the portion 3 with the rollers 5 at the side of the shank 1.

The formation of a thread in a bore is carried out in the following way.

The groove-forming portion 3 (FIG. 2) moving in the bore of a workpiece in an axial direction forms a helical groove by raising a portion of the workpiece material from the area beyond the diameter of the roots of the thread to be obtained and thus reducing the diameter of the bore in the workpiece. This done, the thread-forming tool portion 4, whose thread tops are displaced relative to the thread tops of the groove-forming portion 3 at least by half the pitch, comes into operation. By virtue of this displacement, the first projection of the thread profile of the thread-forming portion 4 agrees with the projection of the helical groove at the moment when the thread-forming portion comes into operation. Deepening into the tops of the helical groove profile at further screwing in of the tool, the thread-forming portion deforms its walls, which results in obtaining a thread having a closed helical cavity disposed below the roots of this thread.

When the position of the portions 3 and 4 is interchanged (FIGS. 3 and 4), the process of forming a thread will be carried out in the following way.

The thread-forming portion 4 moves in the bore of a workpiece in the axial direction freely if the diameter of the bore in the workpiece is larger than the major diameter of the thread to be obtained, or by the method of self-engagement if the diameter of the bore is smaller than the major diameter of the thread to be obtained, which results in the formation of a thread having a small depth. The groove-forming portion 3, following the thread-forming portion 4, forms a helical groove raising a portion of the material from the area beyond the diameter of the roots of the thread to be obtained and thus reducing the diameter of the original bore.

After reversing the rotation of either the tool or the workpiece, the tool starts to screw out with the groove-forming portion 3 serving as a thread template, which directs the tops of the thread of the portion 4 strictly between the roots of the obtained groove.

When the screw tap is completely screwed out, the helical groove is turned into a cavity disposed inside the obtained thread. Thus, with screwing the tool in, there is formed a helical groove in the workpiece, and with its screwing out, a resilient thread is formed.

This tool proves most advantageous in forming a resilient thread in blind bores.

Apparently, in the case when the thread-forming portion 4 and the groove-forming portion 3 are made in the form of rollers 7 and 8 uniformly positioned on the circumference of the body 6 and having an annular thread whose pitch is equal to the pitch of the thread to be obtained, the tool will operate in the same way as it was described above.

Now, there is a particular example of the carrying out the method of the invention.

EXAMPLE

The example of carrying out the method is presented for restoration of a stripped thread M $18 \times 1.5$ in a steel 20 by means of a two-portion chipless screw tap with the following geometry of the first groove-forming portion of the threading head:

profile angle: $\beta = 50°$;
major diameter: $d = 18.9$ mm;
the value of dulling the top of the profile of the groove-forming portion $S = 0.2$ mm.

The second portion of the threading head is made according to the USSR State Standard 18 842-73.

The minor diameter of the thread which was remained on nuts was $17.8 + 0.1$ (75% wear). A resilient thread having a closed helical cavity inside the thread was formed in these nuts with their standard dimensions on a lathe (type 1A616) with a single stroke of the screw tap at the speed of the lathe spindle 400 r.p.m. A lubrication MP-1 was used.

A statistic research was made on the static strength of the restored thread under the conditions when the material of a bolt was considerably stronger than that of a nut.

The static strength of the restored thread is higher than the strength of the thread before the wear by a factor of 1.9.

It is understood that such method of forming a thread may be utilized also for forming external threads.

While the invention has been particularly shown and described with reference to the preferred embodiment thereof, it will be understood by those skilled in the art that various changes and additions may be made without departing from the spirit and scope of the invention defined in the appended claims.

INDUSTRIAL APPLICABILITY

The invention may prove most advantageous in forming a resilient thread in bores whose diameter is between the angle diameter and the major diameter of a thread being formed. The invention may prove equally advantageous in restoraton of stripped thread whose remained portion is 20 or less percent of the original one (80% wear).

We claim:
1. A method of forming a resilient thread having a closed helical cavity inside the thread on a workpiece, comprising forming a helical groove having a depth exceeding by value the depth of the roots of the thread to be obtained, the volume of the material of the workpiece, expelled in forming the helical groove, corresponding to the volume of the closed helical cavity inside the thread being formed; and forming said resilient thread by plastic deformation of the walls of said helical groove, wherein the closed helical cavity is disposed within the threads and below the roots of said thread.

* * * * *